Figure 1:
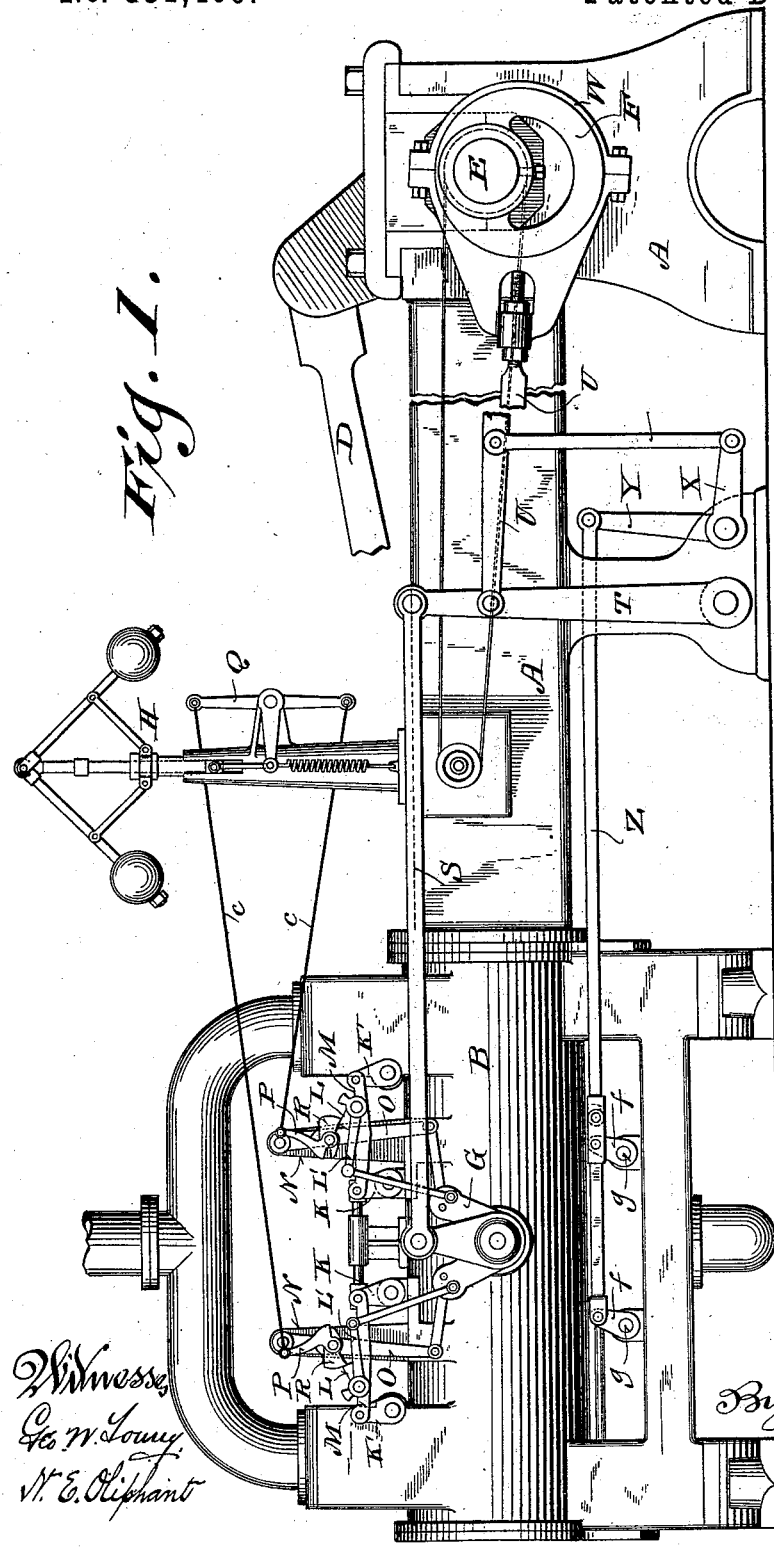

(No Model.) 4 Sheets—Sheet 1.
M. B. COPE.
VALVE GEAR FOR STEAM ENGINES.
No. 531,409. Patented Dec. 25, 1894.

Witnesses
Geo. W. Lowry
N. E. Oliphant

Inventor
Melvin B. Cope
By H. G. Underwood
Attorney

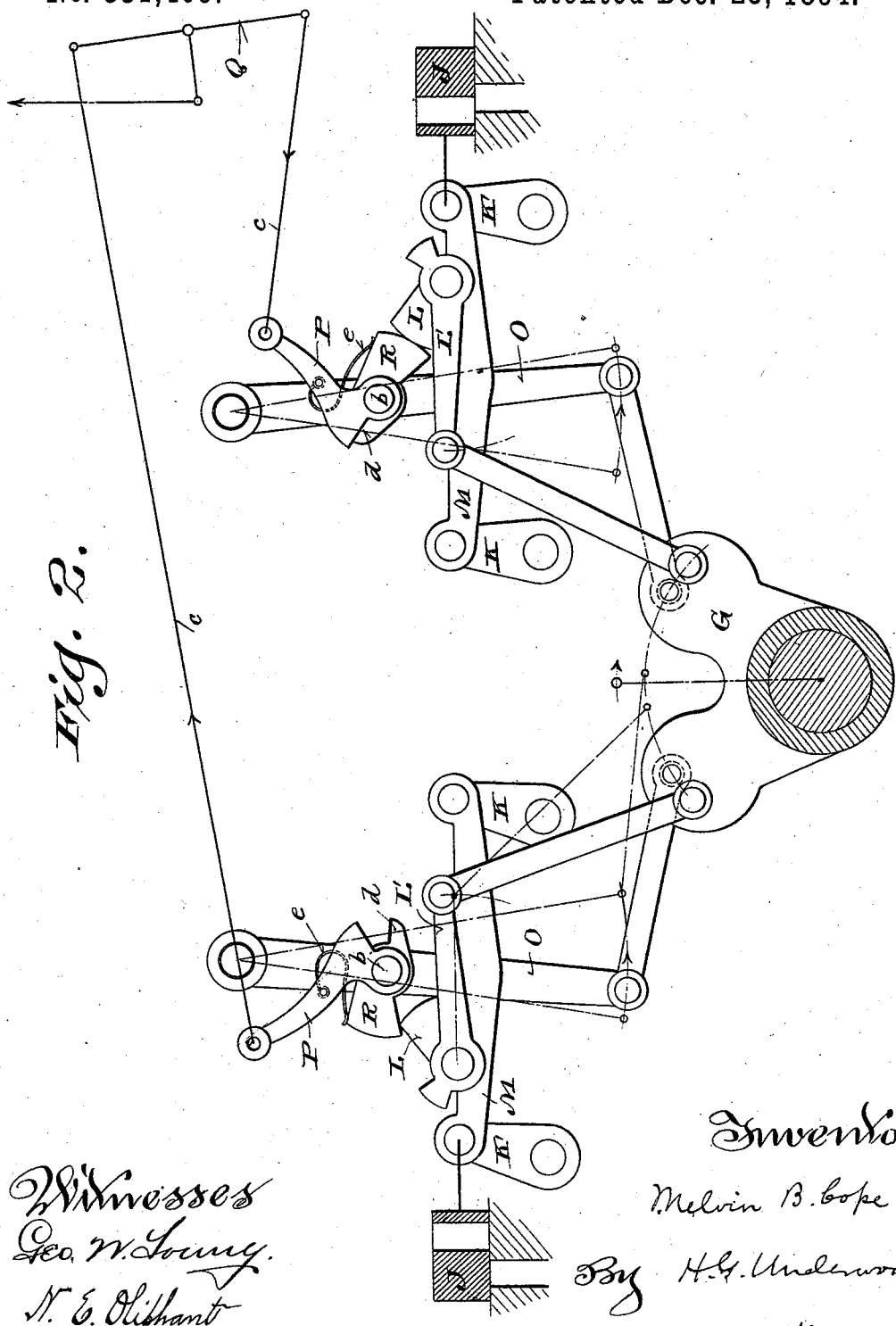

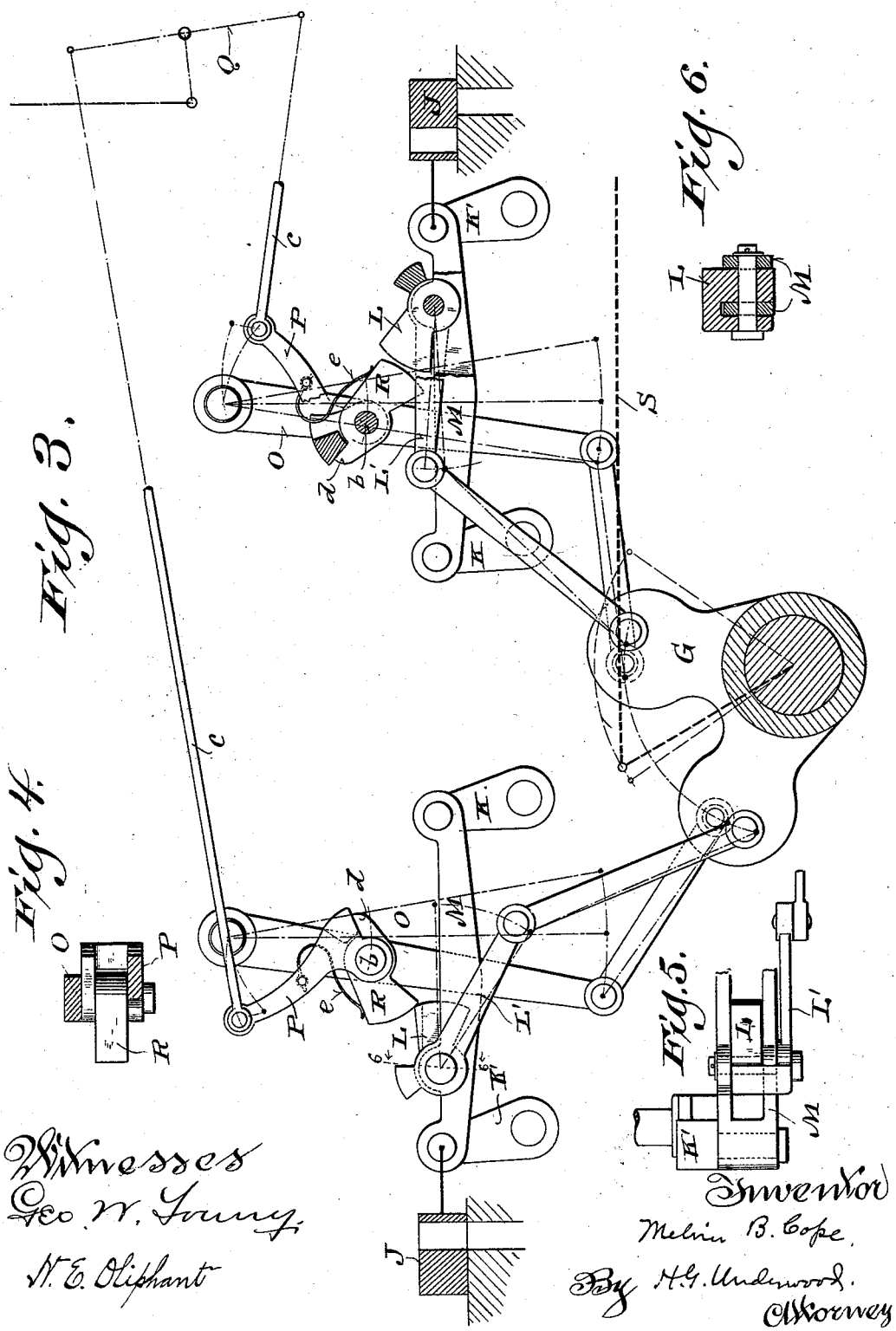

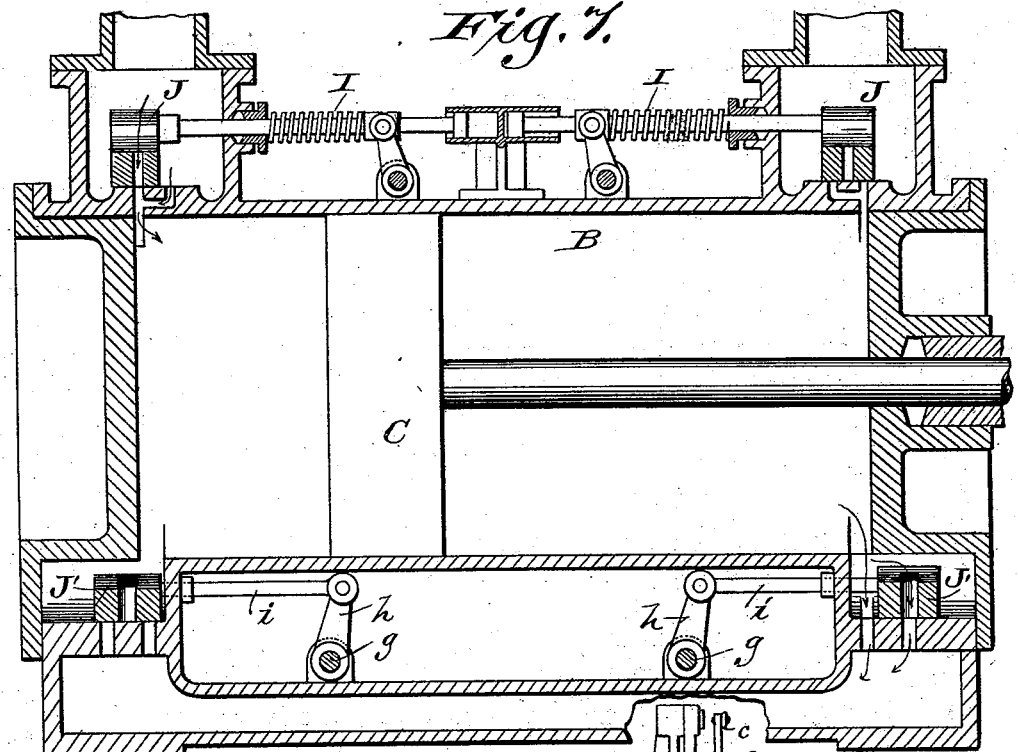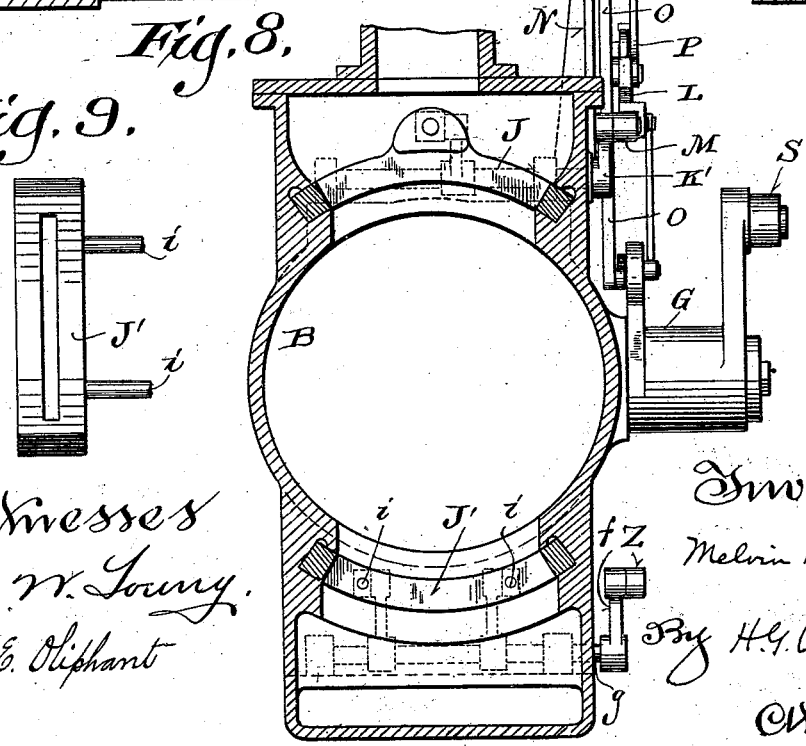

UNITED STATES PATENT OFFICE.

MELVIN B. COPE, OF MILWAUKEE, WISCONSIN.

VALVE-GEAR FOR STEAM-ENGINES.

SPECIFICATION forming part of Letters Patent No. 531,409, dated December 25, 1894.

Application filed February 17, 1894. Serial No. 500,450. (No model.)

*To all whom it may concern:*

Be it known that I, MELVIN B. COPE, a citizen of the United States, and a resident of Milwaukee, in the county of Milwaukee, and in the State of Wisconsin, have invented certain new and useful Improvements in Valve-Gear for Steam-Engines; and I do hereby declare that the following is a full, clear, and exact description thereof.

My invention has for its object to provide a steam-engine with a governor-controlled mechanism that will insure a quick opening of the supply valves and positively effect a cut-off of the same at practically any point within the limits of the piston-stroke.

A further object of the invention is to lessen the usual clearance or waste-room in slide-valve engines, and to insure proper action of the exhaust-valves in conjunction with said supply valves.

In view of the foregoing said invention consists in certain peculiarities of construction and combination of parts hereinafter specified with reference to the accompanying drawings and subsequently claimed.

In the drawings: Figure 1 represents a side elevation of a stationary slide-valve steam-engine embodying my improvements. Figs. 2 and 3 are diagrams representing the action of my improved governor-controlled mechanism employed to open the supply-valves of the engine-cylinder and insure their cut-off at various points within the limits of the piston-stroke. Fig. 4 represents a wiper and lever that constitute part of the improved valve-gear, the illustration being a plan partly in approximate horizontal section. Fig. 5 represents a detail plan view of a portion of said valve-gear and is designed to particularly illustrate a pallet that constitutes part of the valve-gear. Fig. 6 represents a detail section taken on line 6—6 of Fig. 3. Fig. 7 represents a vertical longitudinal section taken through the engine cylinder. Fig. 8 represents a section taken on line 8—8 of the preceding figure, and Fig. 9 represents a detail plan view of the specific form of exhaust-valve embodied in the engine herein illustrated.

Referring by letter to the drawings A represents the frame; B, the cylinder; C, the piston; D, the pitman; E, the crank-shaft; F, the eccentric; G, the wrist-plate, and H the governor common to various types of stationary engines.

As herein shown the supply and exhaust ports of the engine-cylinder are controlled by slide-valves of peculiar construction in order to obtain a certain result hereinafter specified, but so far as the main feature of the present invention is concerned any of the various well known valves may be substituted for those aforesaid, and in any case a spring I or other suitable means may be employed to effect an automatic closing of each supply valve J subsequent to a trip of the peculiar governor-controlled gear hereinafter specified.

Cranks K are arranged on the engine-cylinder and connected to the stems of the valves J constitute the primary actuating devices for said valves and it is essential to the successful operation of the gear for said valves that pallets L be in either direct or indirect pivotal connection with said primary actuating devices. As herein shown the pallets L are pivoted in slotted push-bars M loose on the cranks K and other cranks K' parallel thereto, the only function of the latter cranks being to support and preserve the horizontal alignment of said push-bars. Whether in direct or indirect pivotal connection with the primary valve-actuating devices, the pallets L have levers L' extended therefrom and these arms are linked to the wrist-plate G of the engine.

Rising from the engine-cylinder are standards N, and hung on these standards are pendulum-arms O also in link-connection with the aforesaid wrist-plate. Pivots *b* project laterally from the pendulum arms and serve as supports for bifurcated levers P that are connected by rods *c* with a pivotal yoke Q having spring-controlled crank-and-link connection with the governor H, as is clearly illustrated in Fig. 1.

Loose on the pivots *b* within the bifurcated ends of the levers P are wipers R and the drop of these wipers is limited by noses *d* extended therefrom to come in contact with the lower ends of said levers. In order to insure the drop of the wipers, I prefer to have the latter oppose the free portions of bow-springs *e* attached to the adjacent levers.

Vibratory movement is imparted to the wrist-plate G by means of a rod S under control of the engine eccentric, and the operation of the valve-gear in connection with said wrist-plate will be best understood by reference to Figs. 2 and 3, respectively illustrating the aforesaid wrist-plate at half throw in one direction and at nearly full throw in the opposite direction. In the same figures I illustrate one valve in its cut off and open positions and the other valve in its travel toward full open and subsequently cut-off, but for convenience in the matter of description we will assume the showing in said figures to represent several positions of a single valve, and the action of the parts constituting its individual gear.

Assuming that one of the wipers R has its full area of contact with the relative pallet, L, and the pendulum arm O carrying said wiper is moving in its working direction as shown at the right of Fig. 2, then the power exerted against said pallet will be communicated to the primary actuating device of the valve to cause a quick opening of the same. While the pendulum arm is on its forward throw there is pivotal movement of the pallet in a direction to pass out of contact with the wiper, and the proportions and relative arrangement of the links connecting said arm and the pallet-lever with the wrist-plate are such that when the aforesaid arm reaches the limit of its throw there will still be travel of said pallet on its pivot, and the primary contact of the aforesaid wiper and pallet being such as to cause a full opening of the valve, the latter will remain in open position until said contact is broken by the completion of the full throw of said pallet lever and thus steam will follow the engine-piston throughout the greater portion of its stroke, even as far as nine-tenths of the same, this being one of the important advantages of my invention. However it is obvious that if the possible full contact area of the wiper be lessened, by action of the governor, the trip of the opposing pallet will be proportionately earlier in the stroke of the piston to thereby reduce the opening of the valve, thus effecting a proportionate reduction in the supply of steam, and whenever the trip takes place said valve is automatically brought to its closed position by the spring or other cut-off mechanism. Should the momentum of the engine increase up to the point that the governor brings the wiper in such position as not to come into working contact with the pallet, the valve must remain closed, and from the foregoing it will be readily understood that there may be a variable intermediate action of said wiper and consequent positive governor-controlled cut-off of said valve at practically any point within the limits of the piston stroke, whereby I economize in the use of steam and maintain a uniform speed of the engine.

At the left of Fig. 3 the valve is shown full open and the pallet about to trip away from the wiper and permit the automatic cut-off of said valve, after which the reverse movement of the wrist-plate will bring the pendulum-arm back to its normal position this movement being illustrated at the left of Fig. 2 and the right of Fig. 3. In consequence of this movement the wiper rides back over the pallet and the latter is returned to normal position in the path of said wiper about the time the wrist-plate completes its reverse movement, as is clearly illustrated at the right of Fig. 3, said valve having remained closed during the time required to effect the latter operation of the parts under control of said wrist-plate and the governor.

As herein shown the wrist-plate connecting rod S is joined to a crank T on the engine-frame and this crank is also joined to another rod U adjustably connected to the ring W surrounding the eccentric on the crank-shaft of the engine. The rod U is linked to one arm X of a bell crank on the engine-frame, and the other arm Y of the bell-crank is joined to a rod Z that in turn connects with cranks $f$ on rods $g$ carrying other cranks $h$ joined to twin-stems $i$ of the exhaust-valves J' of the engine-cylinder. By means of the construction and arrangement of parts just described it will be seen that the action of the rod Z has a movement practically at right angles to the wrist-plate rod S whereby I avoid the necessity for another eccentric and insure the proper action of the exhaust valves in conjunction with the supply-valves, this movement being best understood by reference to Fig. 7, wherein a supply valve and exhaust valve are shown full open on opposite sides of the piston, the other valves being full closed.

The proportions and range of movement of each exhaust valve are such that it will have some travel after being opened or closed in order to compensate for the throw of the eccentric, and as a matter of preference there are two exhaust ports at each end of the cylinder governed by a slotted valve such as is shown in detail by Fig. 9.

The slide valves herein shown are four in number, there being two supply-valves and two exhaust-valves, the former valves being at the top of the engine-cylinder and the others at the bottom of the same. Each of the several valves is a segment of a circle. Consequently the face and seat of said valves only extend partly around the engine-cylinder, their plane of contact being parallel to the bore of said cylinder. It is also to be observed that the supply-valves act independent of the exhaust-valves and that no auxiliary devices or means are necessary to make said valves steam-tight.

Having thus described my invention, what I claim as new, and desire to secure by Letters Patent, is—

1. The combination of the engine-cylinder, its supply valves, their primary actuating devices, the vibratory wrist-plate, pallets having pivotal connection with said valve-actuating devices and link-connection with said wrist-plate, pendulum arms also linked to the aforesaid wrist-plate, and governor controlled wipers carried by said arms to have variable intermittent contact with the pallets, substantially as set forth.

2. The combination of the engine-cylinder, its supply valves, their primary actuating devices, the vibratory wrist-plate, pallets having pivotal connection with said valve-actuating devices and link-connection with said wrist-plate, pendulum arms also linked to the aforesaid wrist-plate, and governor-controlled spring-resisted wipers carried by said arms to have variable intermittent contact with said pallets, substantially as set forth.

3. The combination of an engine-cylinder, its supply-valves, their primary actuating devices, the vibratory wrist-plate, the governor, and a gear for each valve that comprises a pair of variable intermittent contact devices under control of said wrist-plate and governor but movable for a time in the same direction proportionate to their area of contact to automatically regulate the opening of the relative valve, substantially as set forth.

4. The combination of an engine-cylinder, its supply-valves, cranks connected to the valve-stems, slotted push-bars connecting these cranks with others parallel thereto, the vibratory wrist-plate, pallets pivoted within the push-bars and provided with lever-arms in link-connection with said wrist-plate, standards rising from said cylinder pendulum arms pivoted to the standards and also linked to the aforesaid wrist-plate, lateral pivots on said arms, bifurcated levers supported on the pivots, a governor-controlled yoke having rod connection with the levers, and wipers that are loose on said pivots within the lever-furcations and have noses opposing the lever-butts, substantially as set forth.

5. The combination of an engine-cylinder, its supply-valves, their gear, the wrist-plate connected to the valve-gear, a rod connected to said wrist-plate, a crank on the engine-frame, the eccentric having ring-and-rod connection with the crank, a bell-crank in link-connection with the eccentric-rod, and the exhaust-valves in working connection with the bell-crank, substantially as set forth.

In testimony that I claim the foregoing I have hereunto set my hand, at Milwaukee, in the county of Milwaukee and State of Wisconsin, in the presence of two witnesses.

M. B. COPE.

Witnesses:
N. E. OLIPHANT,
H. G. UNDERWOOD.